June 16, 1942. T. J. STURTEVANT 2,286,987
AIR SEPARATOR
Filed Dec. 24, 1940 2 Sheets-Sheet 1

Inventor
Thomas J. Sturtevant
by Nathaniel P. Wharton
Atty.

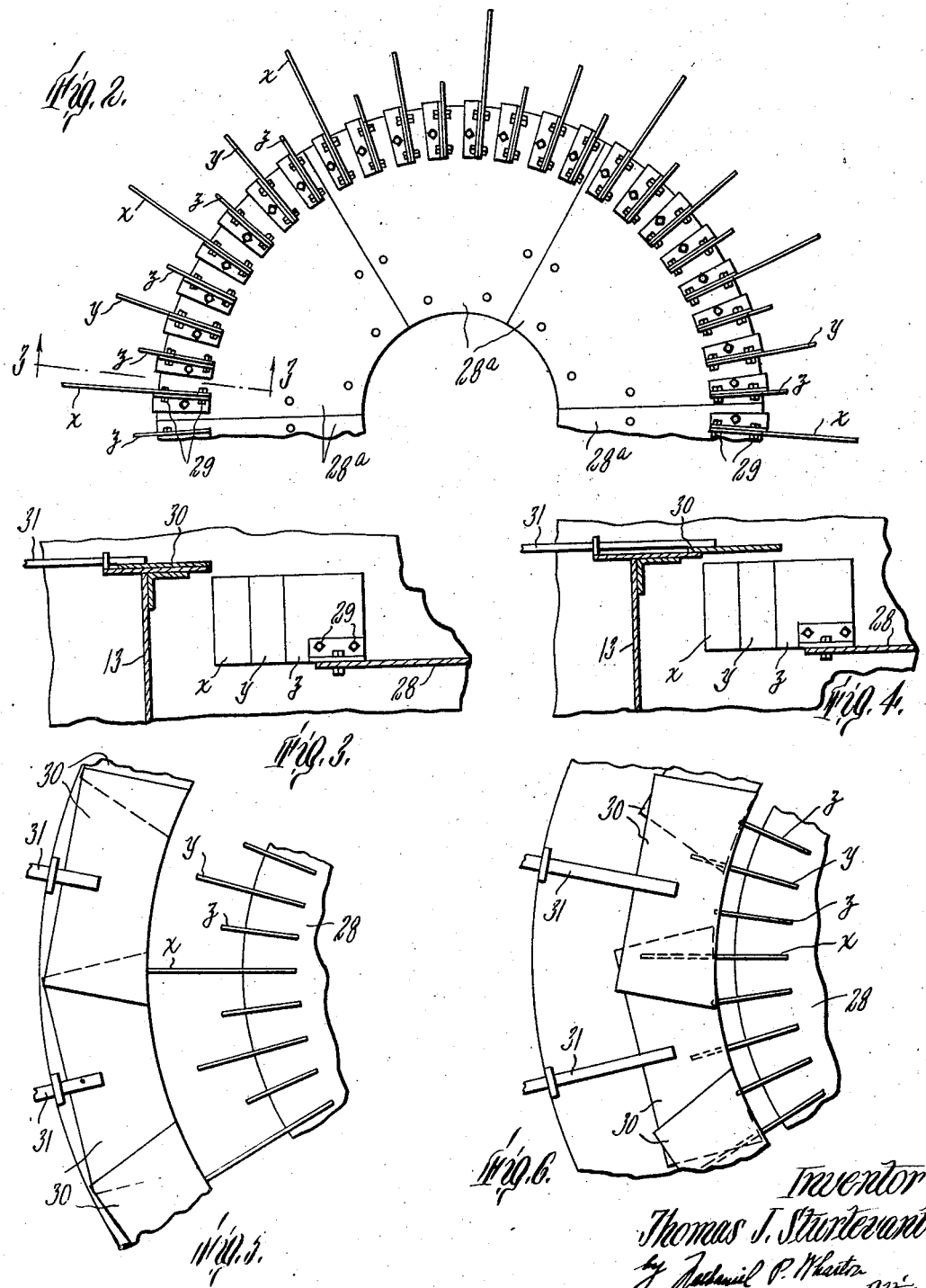

Patented June 16, 1942

2,286,987

UNITED STATES PATENT OFFICE 2,286,987

AIR SEPARATOR

Thomas J. Sturtevant, Wellesley, Mass., assignor to Sturtevant Mill Company, Boston, Mass., a corporation of Massachusetts Application December 24, 1940, Serial No. 371,474

7 Claims. (Cl. 209—139)

This invention relates to an air separator of the whirlwind or centrifugal type for grading or separating particulate material, such as is disclosed in various prior art patents issued to me, for example, Patents Nos. 2,188,634; 2,030,612; and 1,999,851.

In an air separator of the foregoing class, a separating chamber and a surrounding collecting chamber are in communication through upper and lower openings, a main fan above the upper opening causing the air to flow or circulate upwardly through the separating chamber and downwardly through the collecting chamber in a closed circuit. The particulate material to be graded or fractionated in terms of particle size is fed into the separating chamber and scattered centrifugally into the path of the rising air current. The fines or that fraction of the particulate material to be recovered or collected as the desired end-product is carried by the rising air current through an annular zone immediately below the upper opening, which is swept by the vanes of a rotary rejector fan. The rejector-fan vanes serve to bat out or cast from air suspension the relatively coarse particles or tailings, which gravitate to the lower or discharge end of the separating chamber while the finer or desired fraction is recovered or collected in the surrounding collecting chamber. The fineness of particle size or selectivity of separation is controlled by an annular series of radially adjustable valve plates at the upper end of the separating chamber, which afford a top cover having a centralized opening of variable size or diameter. The valve plates can be made to overlap the upper edges of the rejector-fan vanes so as to enable such vanes to sweep substantially the entire ascending stream of particle-laden air before it can escape through the upper end opening of the separating chamber into the surrounding collecting chamber.

The present invention is directed more particularly to an improvement in the rejector fan of a separator of the foregoing class; and its objective is to make possible even greater range and flexibility of operation in such a separator, including greater selectivity or sharpness of separation, while preserving substantially unaltered the rest of the separator structure. In accordance with the present invention, this is accomplished by providing a rejector fan which comprises, as heretofore, a baffle plate mounted on the same central shaft as rotates the centrifugal distributor for the particulate material, but which includes two or more series of circumferentially spaced vanes of different lengths mounted on the baffle plate, the outer edges of each series of vanes being at different radial distances from the center of rotation of the baffle and the top longitudinal edges of all the series of vanes sweeping in a substantially common plane closely adjacent to the centralized upper end opening of the separating chamber. Such a rejector fan is advantageous in that the usual valve plates or their equivalent heretofore used for varying the size of such centralized upper opening may be adjusted to overlap the top longitudinal edges of one or more of the series of vanes, as desired, and thereby to vary the number of vanes of the rejector fan brought into full or effective play. Since the sharpness of selection or fineness of particle size of collected product depends upon, and can be controlled by, the number of vanes in the rejector fan, it is thus seen that the present invention provides in effect a number of rejector fans in a single rejector-fan structure and makes possible wider range of control of product without need of stopping the separator and/or of changing the rejector fan therein.

With the foregoing and other features and objects in view, the present invention will now be described in further detail with particular reference to the accompanying drawings, wherein, Fig. 1 represents a largely vertical section through an air separator equipped with the improved rejector fan of the present invention.

Fig. 2 is a semi-plan view of the rejector-fan, including a multi-section baffle on which the rejector-fan vanes are mounted.

Fig. 3 is a fragmentary section on the line 3—3 of Fig. 2 and depicts the valve plates in fully open position.

Fig. 4 is a similar view but with the valve plates in fully closed position.

Figs. 5 and 6 represent fragmentary plan views of the valve plates as positioned in Figs. 3 and 4, respectively.

Figure 1:
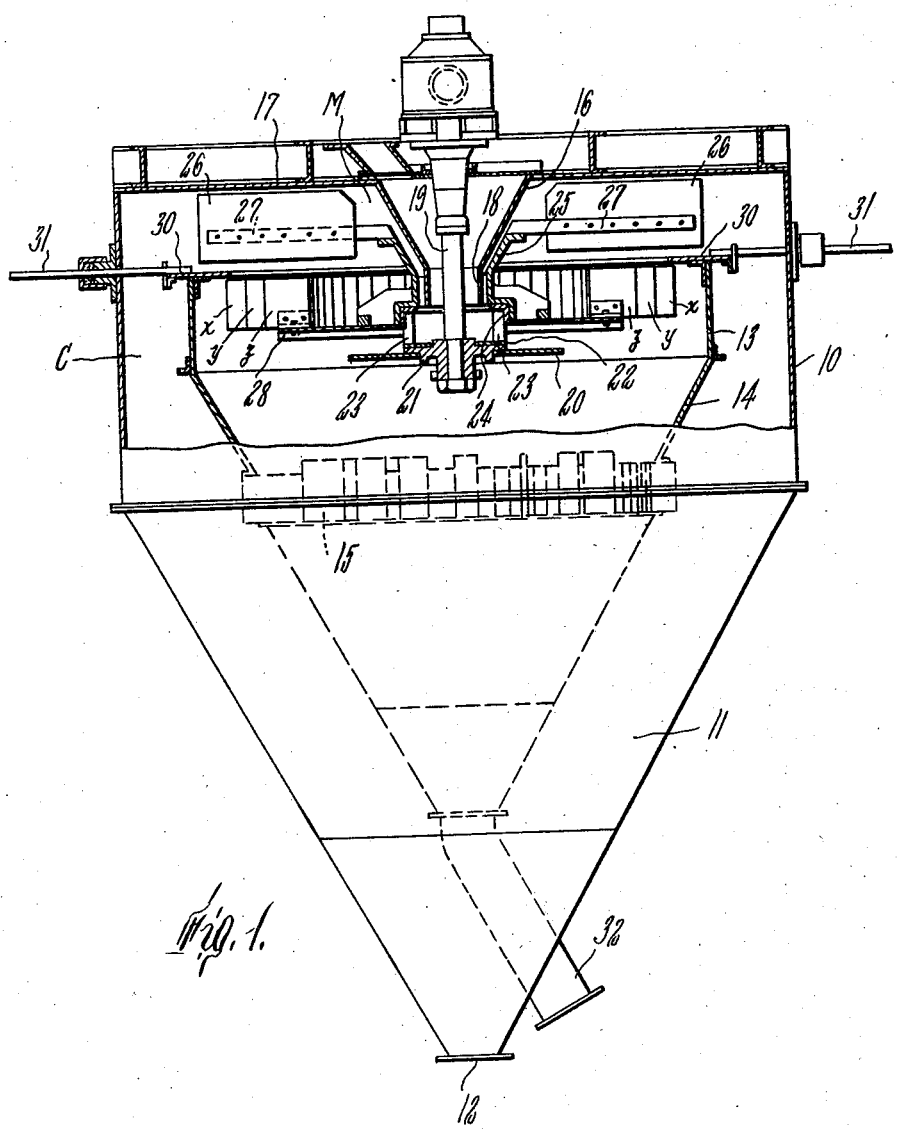

As shown in Fig. 1, the separator comprises an outer cylindrical casing section 10 and a lower conically shaped section 11 having a discharge spout 12 from which the collected fines fraction or desired end-product emerges. Spaced inside the sections 10 and 11 is an inner shell definitive of the separating chamber, such inner shell comprising a cylindrical upper section 13 and a conically shaped lower section 14 open or interrupted at an intermediate region by a vane-carrying ring 15, the details of which it is unnecessary to describe herein excepting to say that, as disclosed in my Patent No. 1,788,361, such ring may carry a series of adjustable or pivotally mounted vanes enabling the desired return of air from the collecting chamber C to the separating chamber.

The particulate material to be air-separated or fractionated is fed into the separating chamber through a conical feed hopper 16 which passes through the head or top 17 of the outer casing, continues down through the main-fan chamber M above the separating chamber, and terminates as a tubular neck 18 extending down through the upper opening into the separating chamber. A vertical shaft 19, which is journaled for rotation in bearings supported by framework above the head 18 and which is driven by suitable means (not shown) extends axially downwardly through the hopper 16 into the separating chamber. Mounted on the shaft 19 below the hopper neck 18 is a rotary distributor plate 20 comprising a hub 21 to which is suitably secured a top plate 22. Upstanding from the distributor hub 21 are posts 23, to which is suitably secured the lower annular flange 24 of a sleeve hub 25 surrounding the hopper and clearing it. The upper end portion of the hub 25 projects into the main-fan chamber M and is provided with radial arms or extensions 27 carrying a series of main-fan vanes 26. The main fan thus supported at the upper end portion of the hub 25 serves to develop the air current that surges upwardly through the separating chamber to suspend the particulate material fed into such chamber and to carry the suspended material through the sphere of action of the rejector-fan vanes presently to be described.

To the lower end portion of the hub 25 is secured an annular baffle 28 on which is mounted the rejector-fan vanes. The baffle is spaced substantially below the centralized upper end opening of the separating chamber and extends horizontally in the separating chamber in spaced substantially parallel relationship above the rotary distributor 20 and somewhat beyond the periphery of the latter. As best shown in Fig. 2, the baffle 28 is preferably made up of a number of sections or segments 28a, for instance, six equal sections, which may be suitably secured to one another, as by bolts. Mounted detachably on the baffle 28 are three circumferential series of radially extending vanes, namely, one series of vanes $x$ of maximum radial length, another series of vanes $y$ of intermediate radial length, and still another series of vanes $z$ of minimum radial length. All of the vanes $x$, $y$, and $z$ project edgewise upwardly from the baffle 28 toward the centralized upper end opening of the separating chamber with their upper longitudinal edges all terminating or sweeping in a substantially common plane closely adjacent to such opening. It will be observed that each vane is bolted to a short piece of angle-iron 29, which itself is in turn bolted to the baffle by a single bolt so that, if desired, the angularity of the face of a vane to a radius of the baffle may be changed. The inner edges of all the vanes $x$, $y$, and $z$ preferably terminate, as shown, at points substantially equidistant from the center of rotation of the baffle; and the bolts for fastening the angle-irons 29 to the baffle preferably lie in a common circle or at the same radial distance from the center of rotation of the baffle. When no change or adjustment of the angularity of a face of a rejector-fan vane to a radius of the baffle 28 is to be made more than one bolt may, of course, be used to fix the angle-irons 29 to the baffle, in which case each series of bolts may lie in a common circle.

The vanes $x$, $y$, and $z$ of the rejector fan all project preferably radially beyond the peripheral edge of the baffle 28 to sweep three angular zones of different widths or diameter immediately below the plane of the centralized upper opening in the separating chamber. Such opening is of variable width and is defined by an annular series of radially adjustable valve plates 30 overlapping one another annularly at the upper end of the separating chamber, each valve plate being equipped with a radial bar or handle 31 passing exteriorly through the wall of the outer casing section 18, as described in further detail in my Patent No. 1,615,558.

In Fig. 3 the valve plates 30 are shown as being wide open, that is, with such plates barely overlapping the upper edge portions of the longest rejector-fan vanes $x$. In such case, the ascending stream of particle-laden air in the separating chamber will pass out of the centralized upper opening in the separating chamber after having undergone the batting-out or rejecting action of the longest vanes, shown herein as being 12 in number; and the finished or collected product emerging from the discharge spout 12 will be relatively coarse. When the valve plates 30 are moved inwardly to overlap the vanes $y$ of intermediate length, the ascending stream of particle-laden air undergoes the batting-out or rejecting action of both the longest vanes $x$ and the vanes $y$ of the intermediate length, shown herein as totalling 24 in number; and a finer-sized collected product will be delivered by the separator. When the valve plates 30 are moved inwardly to overlap the shortest vanes $z$, as illustrated in Fig. 4, all the vanes of the rejector fan, herein shown as being 48 in number, are brought into full effective play in sweeping the stream of particle-laden air as it passes out through the centralized opening of the separating chamber, wherefore, the finished or collected product from the separator will be relatively extremely fine.

The separator of the present invention operates otherwise in accordance with the principles described in my earlier patents. That is to say, the particulate material to be separated or fractionated is fed downwardly through the hopper 16 onto the rotary distributor 20, which throws the particles by centrifugal force outwardly into the rising air currents induced in the separating chamber by the main-fan vanes 26. The particles are thus suspended in such air currents and are carried upwardly thereby into the annular zone below the centralized opening of the separating chamber as such zone is being swept by the vanes of the rotary rejector-fan; and, in the course of thus being swept, the relatively coarse or heavy particles are batted out of air suspension toward and onto the wall of the separating chamber and pass downwardly thereon toward the lower end of the separating chamber and out through the tailings or rejects spout 32. The relatively light or fine particles passing into the main-fan chamber M settle in the annular collecting space or chamber C and emerge from the discharge spout 12 of the outer casing, as previously indicated.

While the rejector fan hereinbefore described as a typical embodiment of the present invention is equipped with three series of vanes of different lengths, it is to be understood that the series may vary in number, so long as there are at least two such series of vanes of different lengths. The length of the vanes in the different series and the number of vanes in each series are subject to variation, depending upon the material being air-separated or fractionated, the degree or selectivity of separation desired, and other conditions encountered in practice. Other changes or modifications might be made in the embodiment of the invention hereinbefore described while falling within the purview of the appended claims, which should here be given the broadest construction permitted by the prior art.

I claim:

1. In an air separator of the class described comprising a casing provided with a separating chamber having a centralized upper end opening, a rotary shaft passing substantially axially downwardly through said opening into said separating chamber, a rotary distributor mounted on said shaft in said chamber and adapted to receive particulate material thereon and to throw it out centrifugally into an air current induced to rise in said chamber, a baffle plate mounted on said shaft in said chamber in spaced relationship above said distributor plate, fan vanes mounted on said baffle in at least two circumferential series, the vanes in all said series projecting beyond the periphery of said baffle and their upper longitudinal edges all lying in a substantially common plane closely adjacent to said centralized upper end opening but the outer edges of the vanes in one series being at a radial distance from said shaft different from that of the vanes in another series, and means adjustable to change the diameter of the centralized upper end opening so that the upper longitudinal edges of substantially all of said vanes can be progressively overlapped or exposed so as to change the number of vanes in full effective use, the diameter of the circle swept by the outer edges of some of said vanes being less than the maximum diameter of said opening.

2. In an air separator of the class described comprising a casing provided with a separating chamber having a centralized upper end opening, a rotary shaft passing substantially axially downwardly through said opening into said separating chamber, a rotary distributor mounted on said shaft in said chamber and adapted to receive particulate material thereon and to throw it out centrifugally into an air current induced to rise in said chamber, a baffle plate mounted on said shaft in said chamber in spaced relationship above said distributor plate, fan vanes mounted on said baffle in at least two circumferential series, the vanes in all said series projecting beyond the periphery of said baffle and their upper longitudinal edges all lying in a substantially common plane closely adjacent to said centralized upper end opening but the outer edges of the vanes in one series being at a radial distance from their axis of rotation different from that of the vanes in another series, and an annular series of valve plates overlapping one another annularly at the upper end of said separating chamber and serving to define said centralized upper end opening in said separating chamber, said plates being radially adjustable to vary the diameter of said upper end opening and to overlap the upper longitudinal edges of one or more of said series of vanes, as desired, the diameter of the circle swept by the outer edges of some of said vanes being less than the maximum diameter of said opening.

3. In an air separator of the class described comprising a casing provided with a separating chamber having a centralized upper end opening, a rotary shaft passing substantially axially downwardly through said opening into said separating chamber, a rotary distributor mounted on said shaft in said chamber and adapted to receive particulate material thereon and to throw it out centrifugally into an air current induced to rise in said chamber, a baffle plate mounted on said shaft in said separating chamber in spaced relationship above said distributor plate but spaced substantially below the plane of said upper end opening, fan vanes detachably mounted on said baffle in at least two circumferential series, the vanes in all said series projecting edgewise upwardly from said baffle toward said opening with their upper longitudinal edges all terminating in a substantially common plane closely adjacent to said opening but with the outer edges of the vanes in one series at a different radial distance from their axis of rotation from that of the vanes in another series, and valve means adjustable to overlap the upper longitudinal edges of the vanes of one or more of said series, as desired, the diameter of the circle swept by the outer edges of some of said vanes being less than the maximum diameter of said opening.

4. In an air separator of the class described comprising a casing provided with a separating chamber having a centralized upper end opening, a rotary shaft passing substantially axially downwardly through said opening into said separating chamber, a rotary distributor mounted on said shaft in said chamber and adapted to receive particulate material thereon and to throw it out centrifugally into an air current induced to rise in said chamber, a baffle plate mounted on said shaft in said separating chamber in spaced relationship above said distributor plate but spaced substantially below the plane of said upper end opening, fan vanes detachably mounted on said baffle in at least two circumferential series, the vanes in all said series projecting edgewise upwardly from said baffle toward said opening with their upper longitudinal edges all terminating in a substantially common plane closely adjacent to said opening but with the outer edges of the vanes in one series at a different radial distance from their axis of rotation from that of the vanes in another series, and an annular series of valve plates overlapping one another annularly at the upper end of said separating chamber and serving to define said centralized upper end opening in said separating chamber, said plates being radially adjustable to vary the diameter of said upper end opening and to overlap the upper longitudinal edges of the vanes in one or more of said series, as desired, the diameter of the circle swept by the outer edges of some of said vanes being less than the maximum diameter of said opening.

5. In an air separator of the character described, the combination of a substantially upright casing having a separating chamber therein provided with a centralized upper end opening means for creating a flow of air upwardly from said chamber through said opening, a baffle plate positioned adjacent to said opening and cooperating with the edge of said opening to confine said flow of air substantially to the outer annular portion of the opening, means for distributing powdered material in said chamber where it will be suspended in said air current, a rotary shaft extending substantially axially downwardly through said opening into said chamber, a fan including vanes carried by said shaft and arranged in a plurality of circumferential series, the vanes in all of said series projecting beyond the periphery of said baffle plate and their upper longitudinal edges all lying in a substantially common plane closely adjacent to said centralized upper end opening, the vanes of one of said series projecting farther from the axis of rotation of said fan than those in another series, and means defining said centralized upper end opening comprising parts adjustable to change its diameter to such a degree as to vary the radial distance by which the end portions of said vanes are overlapped by the parts at the margin of said opening, the diameter of the circle swept by the outer edges of some of said vanes being less than the maximum diameter of said opening.

6. An air separator according to preceding claim 5, in combination with devices operable while the machine is in operation for adjusting said parts which change the diameter of said opening.

7. In an air separator of the character described, the combination of a substantially upright casing having a separating chamber therein provided with a centralized upper end opening, means for creating a flow of air upwardly from said chamber through said opening, a baffle plate positioned adjacent to said opening and cooperating with the edge of said opening to confine said flow of air substantially to an annular portion of said opening between the edge of said baffle plate and the edge of the opening, means for distributing powdered material in said chamber where it will be caught in said air stream and carried upwardly through said opening, a rotary shaft extending substantially axially downwardly through said opening into said chamber, a horizontal fan including a circumferential series of vanes carried by said shaft, said series of vanes varying in outer diameter and substantially all of them projecting beyond the periphery of said baffle plate with their upper longitudinal edges lying in a substantially common plane closely adjacent to said centralized upper end opening, and means adjustable to change the path taken by said dust laden air current as it flows upwardly through the vanes of said fan to said opening, said means including parts adjustable to shift said air current toward and from the axis of rotation of said vanes, as desired, the diameter of the circle swept by the outer edges of some of said vanes being less than the maximum diameter of said opening.

THOMAS J. STURTEVANT.